United States Patent

[11] 3,602,594

| [72] | Inventors | Melvin S. Cook<br>Scarsdale, N.Y.;<br>Ronald L. Kirk, Franklin Lake, N.J. |
|---|---|---|
| [21] | Appl. No. | 790,073 |
| [22] | Filed | Jan. 9, 1969 |
| [45] | Patented | Aug. 31, 1971 |
| [73] | Assignee | Holobeam Inc.<br>Paramus, N.J. |

[54] LASER CALIBRATION OF LARGE RADIO REFLECTOR
2 Claims, 4 Drawing Figs.

| [52] | U.S. Cl. | 356/5, 356/156 |
|---|---|---|
| [51] | Int. Cl. | G01c 3/08 |
| [50] | Field of Search | 356/5, 2, 109, 209, 237 |

[56] References Cited
UNITED STATES PATENTS

| 2,490,899 | 12/1949 | Cohen | 356/5 |
|---|---|---|---|
| 3,435,227 | 3/1969 | Arazi | 356/5 |

*Primary Examiner*—Rodney D. Bennett, Jr.
*Assistant Examiner*—J. M. Potenza
*Attorney*—Sandoe, Hopgood & Calimafde ABSTRACT: A device for calibrating a large body surface to determine surface irregularities is described. A laser is modulated with a sinusoidal high frequency source and its beam directed at the body surface. Reflected optical signals are detected and phase compared with the sinusoidal source. The phase error measured is representative of antenna surface variations.

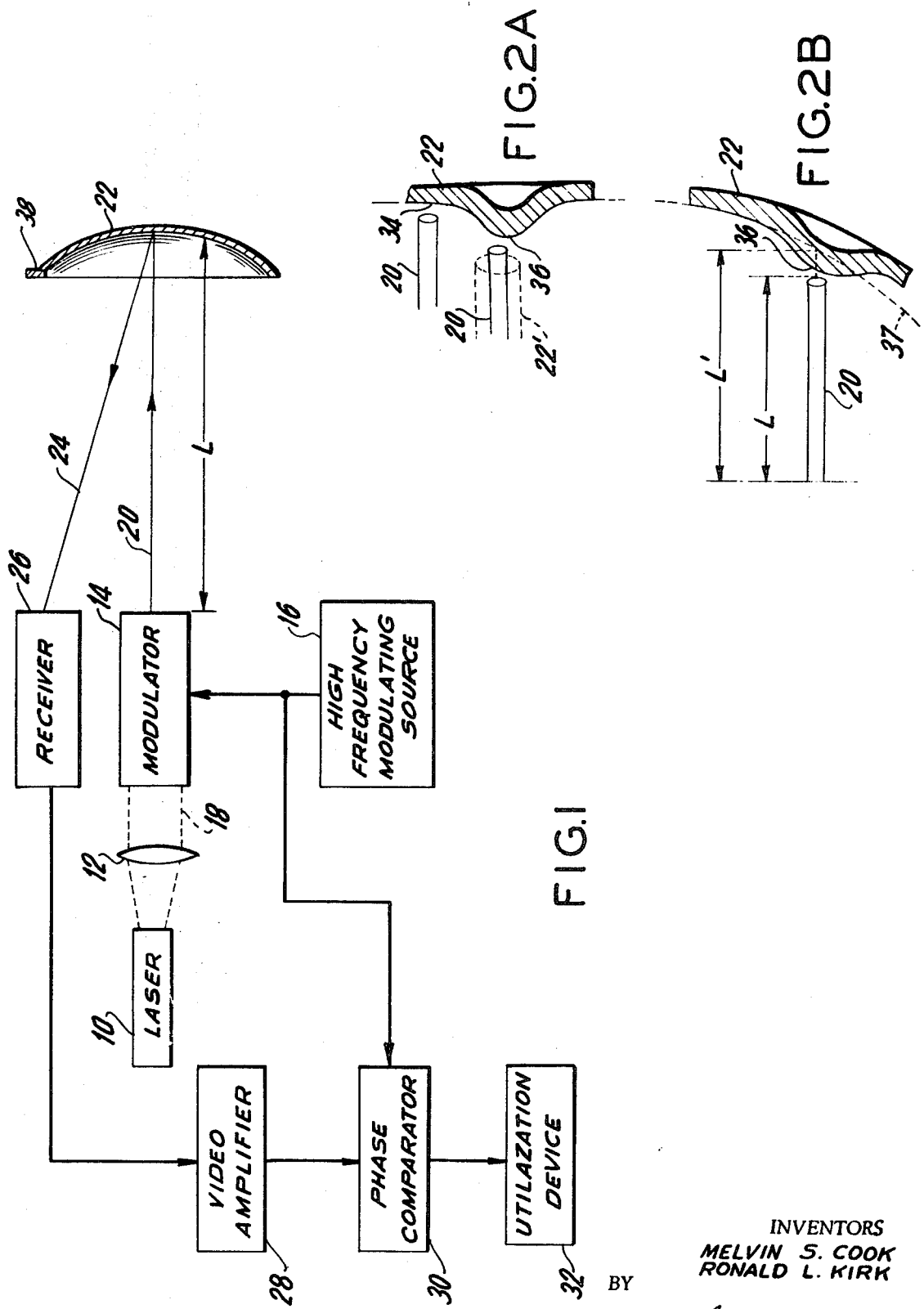

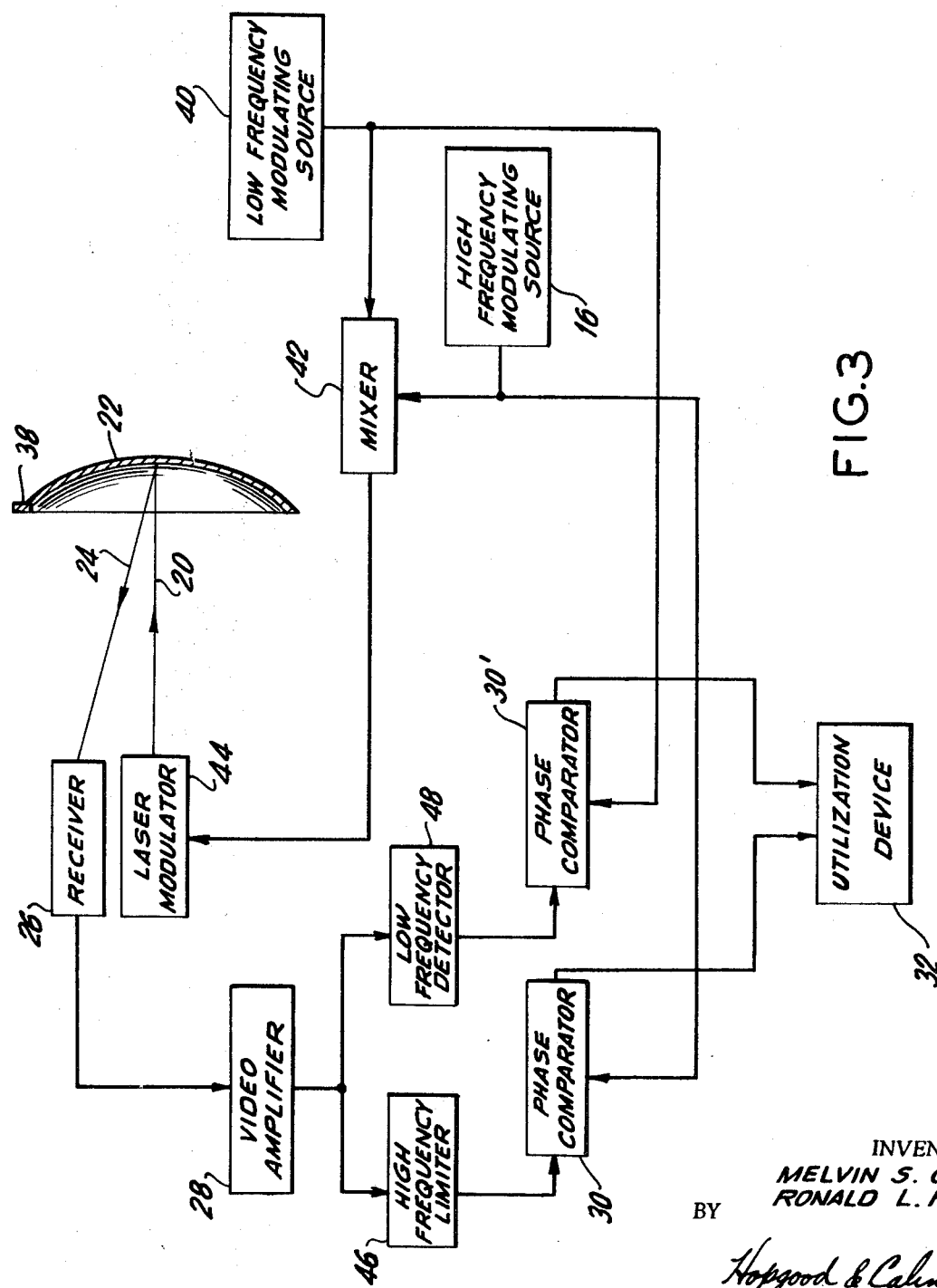

LASER CALIBRATION OF LARGE RADIO REFLECTOR

This invention relates to an apparatus for the detection of surface irregularities of a body of known contour such as a parabolic antenna.

In the field of large parabolic antenna systems, variations in the surface of the parabolic antenna cause deleterious effects on the signals to be focused by the antenna. It is known that surface variations of a large parabolic antenna decrease the effective gain of the antenna. For instance, RMS surface variations of the order of 0.1 inch will introduce a loss in power gain of about 6 db. at a frequency of 10 GHz. Generally, the smaller the RMS variations in the surface, the lower the gain loss. For instance, if the RMS surface variation is reduced by a factor of 10, then the loss in power gain becomes less then a tenth of a db. at the 10 GHz. frequency. It is, therefore, very important for large antenna installations that surface irregularities are minimized.

For large antenna installations such as a 300-foot diameter parabolic radio telescope, the correction of surface irregularities becomes a terrific engineering problem.

It is therefore an object of this invention to provide an apparatus for the accurate detection of surface irregularities on a body.

It is a further object of this invention to provide a device for calibrating the surface contour of a large body such as a parabolic antenna.

The above-mentioned and other features and objects of this invention and the manner of attaining them will become more apparent and the invention itself will best be understood by reference to the following description of embodiments of the invention taken in conjunction with the accompanying drawings, the description of which follows.

FIG. 1 is a block diagram view of a first embodiment according to this invention;

FIGS. 2A and 2B are detailed cross-sectional views of antenna surface irregularities detectable by the system of this invention; and FIG. 3 is a block diagram view of another embodiment incorporating the invention.

Briefly stated, our invention contemplates directing an amplitude-modulated light beam onto the surface of the body to be monitored and detecting the reflected light beam from the surface of the body, removing the amplitude-modulation from the received reflected signal and comparing this with a portion of the signal used to modulate the light beam to derive an electrical error signal representative of the height of a surface irregularity. The variations in the error signal are then representative of the surface variations of the body.

With reference to FIG. 1, a coherent light beam source is generated from a laser 10 and after suitable optical processing in a lens system 12 is passed through an optical modulator 14. A high-frequency sinusoidal modulating source 16 operating at a frequency of, say 100 MHz. is applied to the modulator to amplitude-modulate the laser beam 18 which, after modulation in modulator 14 and appears as an amplitude-modulated laser beam along a path 20 which is directed at a surface the contour of which is to be examined for irregularities such as the dish portion of a parabolic antenna 22. The beam is reflected by the antenna along an optical path 24 and the reflected signal is detected by a receiver 26 which transduces the optical energy to an electrical signal by use of a conventional optical detector.

The optical paths 20, 24 in FIG. 1 are shown as having a fairly large angle between them, but it is to be realized that in practice, this angle will be quite small. For instance, if receiver 26 and modulator 14 are closely spaced and the antenna dish portion is located at a distance of 30 feet from both, the angle will be at most several minutes of an arc.

The electrical output from receiver 26 is passed on to a video amplifier 28 for amplification and then passed on to a phase comparator 30 which has another input coupled to the output of the high-frequency modulating source 16. The output of the phase comparator 30 is an error signal 68 which is then applied to a utilization device 32 such as a strip chart recorder or a data processing apparatus.

The total distance travelled by the beam, i.e. including the transmit and receiving paths 20, 24 may be considered to act as a variable delay line. Variations in the delay are representative of both surface irregularities and a change of the contour of the parabolic antenna 22. Consequently, the total distance travelled by the light beam, i.e. including the transmitting and receiving paths, produces a phase shift of the received of the received signal relative to the signal from the high-frequency modulating source.

For instance, if the transmit and receiving paths are considered the same length, L, then the delay introduced is equal to $2LC$, where C is the speed of light If one then considers a surface fluctuation of such a magnitude that it produces a change in the total delay time equal to $\Delta\tau$, then the differences in phase measured in degrees at the output of comparator 30 is: $360 \times \Delta\tau/t$, where $t$ represents the period of the high-frequency sinusoidal modulating source. This phase error signal is representative of twice the height of a surface irregularity.

It should be noted here that the phase error signal from the comparator 30 does not by itself indicate a surface irregularity. Rather, only after comparison with phase error signals of adjacent body surface portions will the irregularity show. Thus a scan of the body surface must be made by utilizing conventional scanning devices and one may then observe surface irregularities from a time-history plot of the error signal $\epsilon$ on, for instance, a strip chart recorder.

For instance, assuming that the fluctuation on the surface of the antenna is such that a variation of $\Delta\tau$ equal to two-thirds times $10^{-11}$ seconds arose and that the modulating frequency source has a frequency of 100 MHz. In such case, the difference in phase measured by the comparator 30 will be equal to $360 \times 2/3 \times 10^{-11}/10^{-8} = 0.240°$. Since the free space wavelength at 100 MHz. is 3 meters, a phase variation of 0.240° is equivalent to 2 millimeters in surface variation. The actual surface variation is one-half of the measured quantity, i.e. 1 millimeter. Since phase comparators are capable of measuring phase differences of 0.1°, the described embodiment of FIG. 1 is capable of precise detection of surface irregularities.

FIG. 2A illustrates how an optical beam may be conveniently used to detect small undesirable surface irregularities. Assume that a beam 20 is directed at the surface of an antenna 22 and is first incident at a flat location 34. By slightly altering the position of the receiver and modulator, the beam may be caused to incident on the raised portion of the antenna at location 36. If the optical beam such as 22' were not small but would have a large diameter the phase error signal $\epsilon$ would be obscured. The reflections from such a large beam 22' would be produced from a large surface area whereby the phase error $t$ would not be clearly defined. On the other hand, by utilizing a finally focused laser beam such as 20, the reflecting area will be small so that even tiny surface variations can be measured.

As is usually the case, however, the antenna contour adds a bias to a measured variation in the phase signal and this may be understood from FIG. 2B. In FIG. 2B the antenna has an irregularity at 36 which can only be observed as an irregularity if the known bias or contour 37 of the antenna as indicated by the L' distance is taken into consideration. Of course, if the surface is spherical and the receiver and modulator are mounted at the center of the spherical surface, then contour variations are automatically cancelled and only surface variations are measured. In practice, however, a spherical contour is not often encountered and the receiver and modulator are located at nonsymmetrical locations where the contour of the antenna must be taken into account for the detection of surface irregularities.

A typical device and method for monitoring the contour of an antenna with the optical system of this invention is to employ a reference mirror 38 on the antenna 22. This mirror 38 will have a known location on the antenna and variations in the contour from this reference are measurable and thus detectable by the optical system of this invention.

Since the surface contour of a large parabolic antenna may be amount substantially greater amount than the free space wavelength of the high-frequency sinusoidal modulating source, ambiguities may arise in the absolute distance measuring of the system of FIG. 1. Accordingly, an additional high-frequency modulating source may be applied to the laser modulator that is a free space wavelength of substantially greater than that used for the source in the embodiment of FIG. 1, and of a dimension that is determined or commensurate with the total distance between the laser modulator and the parabolic surface of the antenna.

In FIG. 3, a high-frequency modulating source 16 is again provided which is mixed with the output of a low-frequency modulating source 40 in a mixer 42. The output of the mixer 42 is applied to a laser and modulator device 44 such as that described in relation to the embodiment of FIG. 1. Typically the output signal from high-frequency modulating source 16 may be 100 MHz. and the output of the low-frequency modulating source 40 may be 1 MHz. The receiver 26 which received the reflected modulated laser beam from the parabolic surface of antenna 22 produces at its output a video signal representative of the combined high and low frequency sources and, after amplification by the wide band video amplifier, the modulating sources are separated and detected. The output from the video amplifier is passed through a high frequency limiter circuit 46 to select the high frequency component which is passed on to a phase comparator 30 such as that employed in the embodiment of FIG. 1. In addition, the video amplifier output signal is applied to a low-frequency detection circuit 48 which, after suitable detection of the low-frequency component applies that signal to a second phase comparator 30, for comparison with the output from the low-frequency modulating source 16. Thus, two error signals are obtained, one essentially being representative of antenna surface irregularities and the other approximately representative of the total distance L between the antenna and the receiver and laser modulator.

The phase error signals produced by phase comparators 30 and 30' are applied to a utilization device 32 which, as in the embodiment of FIG. 1, may be a strip chart recorder or a data processor.

While the principles of the invention have been described in connection with specific apparatus, it is to be clearly understood that this description is made only by way of example and not as a limitation to the scope of the invention as set forth in the objects thereof and in the accompanying claims.

We claim:

1. A system for detecting amplitude irregularities in the contour of a remotely located body, comprising
    means for generating a coherent beam of light for directing the beam at a preselected target area on the surface of said body,
    means for generating a first modulating signal of a free space wavelength commensurate with that necessary for sensing the amplitude of the irregularity on the body surface,
    means for amplitude-modulating said coherent light beam with said first modulating signal and for directing said modulated coherent light beam at said body surface,
    sensing means located directly adjacent said modulating means for receiving the reflected modulated light beam from the target area on the body surface and for producing a signal representative of the reflected light beam
    means for detecting the amplitude modulation in the reflected light beam signal corresponding to said modulating signal,
    first comparator means coupled to said detecting means for comparing said modulating signal and the detected first modulating signal and for producing a first phase error signal representative of the difference in phase therebetween in response to that comparison, the variations in said first phase error signal being representative of variations in the contour of said body surface, and
    means coupled to said comparator means and including means for comparing said first phase error signal from adjacent body surface portion for providing an indication of an irregularity on the body surface.

2. The system as recited in claim 1 further comprising
    means for generating a second modulating signal of a free space wavelength commensurate with that necessary for removing distance ambiguities between the body surface and the light beam generating means, said second modulating signal having a substantially longer wavelength than the wavelength of said first modulating signal,
    said amplitude-modulating means being responsive to said second modulating signal for amplitude-modulating said coherent light beam with both said first and second modulating signals,
    means for detecting the amplitude-modulating in the reflected light beam signal corresponding to said second modulation signal, and
    second comparator means responsive to the first modulating signal and to the detected second modulating signal for producing a second phase signal representative of the difference in phase therebetween with variations in said second phase signal being substantially representative of variations in the distance between said body surface and the light beam generating means.